(12) United States Patent
Nakhla

(10) Patent No.: US 12,552,301 B2
(45) Date of Patent: Feb. 17, 2026

(54) CHILD RESTRAINT

(71) Applicant: Dorel Juvenile Group, Inc., Foxboro, MA (US)

(72) Inventor: Said S. Nakhla, Daphne, AL (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 278 days.

(21) Appl. No.: 18/512,705

(22) Filed: Nov. 17, 2023

(65) Prior Publication Data

US 2024/0166095 A1 May 23, 2024

Related U.S. Application Data

(60) Provisional application No. 63/426,061, filed on Nov. 17, 2022.

(51) Int. Cl.
*B60N 2/28* (2006.01)
*B60N 2/26* (2006.01)

(52) U.S. Cl.
CPC ............ *B60N 2/265* (2013.01); *B60N 2/28* (2013.01); *B60N 2/286* (2013.01); *B60N 2/2863* (2013.01)

(58) Field of Classification Search
CPC .............................. B60N 2/265; B60N 2/2821
See application file for complete search history.

(56) References Cited

U.S. PATENT DOCUMENTS

| | | | | |
|---|---|---|---|---|
| 2005/0184567 A1* | 8/2005 | Carpenter | ............ | B60N 2/2821 297/256.16 |
| 2008/0290708 A1* | 11/2008 | Pos | ...................... | B60N 2/2821 297/256.12 |
| 2009/0273215 A1* | 11/2009 | Barker | ................. | B60N 2/2821 297/253 |
| 2012/0326477 A1* | 12/2012 | Biaud | .................. | B60N 2/2812 297/250.1 |
| 2022/0332225 A1* | 10/2022 | Hutchinson | .......... | B60N 2/2875 |

* cited by examiner

*Primary Examiner* — David R Dunn
*Assistant Examiner* — Tania Abraham
(74) *Attorney, Agent, or Firm* — Barnes & Thornburg LLP

(57) ABSTRACT

A child restraint comprising an outer seat-support shell adapted to rest on a vehicle seat and to be secured to the vehicle seat for transportation in a vehicle and an inner juvenile seat coupled to the outer seat-support shell. The inner juvenile seat is configured to provide a child-receiving space sized to receive a child therein.

17 Claims, 4 Drawing Sheets

CHILD RESTRAINT

PRIORITY CLAIM

This application claims priority under 35 U.S.C. § 119(e) to U.S. Provisional Application Ser. No. 63/426,061, filed Nov. 17, 2022, which is expressly incorporated by reference herein in its entirety.

BACKGROUND

The present disclosure relates to a child restraint, and particularly to a child restraint including a juvenile seat. More particularly, the present disclosure relates to child restraint including a juvenile seat and that is configured to be secured to a vehicle seat for transportation in the vehicle.

SUMMARY

According to the present disclosure, a child restraint adapted to be secured to a vehicle seat includes a seat-support shell and an inner juvenile seat supported by the seat-support shell. The outer seat-support shell is adapted to rest on the vehicle seat and to be secured to the vehicle seat for transportation in a vehicle. The outer seat-support shell provides a seat receiving space which receives at least a portion of the inner juvenile seat. The inner juvenile seat is at least partially received in the seat receiving space and is configured to provide a child-receiving space sized to receive a child therein.

In illustrative embodiments, the outer seat-support shell is formed to include three vehicle seatbelt paths. To install the child restraint on the vehicle seat, a vehicle seat belt is routed through one or more of the vehicle seatbelt paths and then tightened and/or locked-off to secure the child restraint to the vehicle seat.

In illustrative embodiments, the child restraint is configured to be reoriented relative to the vehicle seat to be arranged in either a forward-facing arrangement for larger/older children or a rearward-facing arrangement for smaller/younger children. The child restraint is structured or includes features which are configured to block access to at least one of the three seatbelt paths in each orientation so that only a correct combination of seatbelt paths are exposed while a user is installing the child restraint on the vehicle seat.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a child restraint, in accordance with the present disclosure, including an outer seat-support shell configured to rest on a vehicle seat and to be secured to the vehicle seat and an inner juvenile seat coupled to the outer seat-support shell and configured to support a child for transportation in the vehicle in either a forward-facing arrangement, as shown in FIG. 1, or a rearward-facing arrangement, as shown in FIG. 2, and showing that the child restraint is formed to include a first seatbelt path, a second seatbelt path, and a third seatbelt path which receive a vehicle seat belt in at least one of the forward-facing arrangement and the rearward-facing arrangement to secure the child restraint to the vehicle seat;

FIG. 2 is a perspective view of the child restraint from FIG. 1 showing the child restraint arranged in the rearward-facing arrangement and showing that the outer seat-support shell includes a shell bottom and a shell back having a fixed back frame and a juvenile-seat brace coupled to an upper end of the fixed back frame and configured to pivot about a horizontal pivot axis between a first seat-support position as shown in FIG. 1 and a second seat-support position, as shown in FIG. 2 in which the juvenile-seat brace extends towards and engages a seat back of the juvenile seat to support the juvenile seat in the rearward-facing arrangement;

Figure 5:
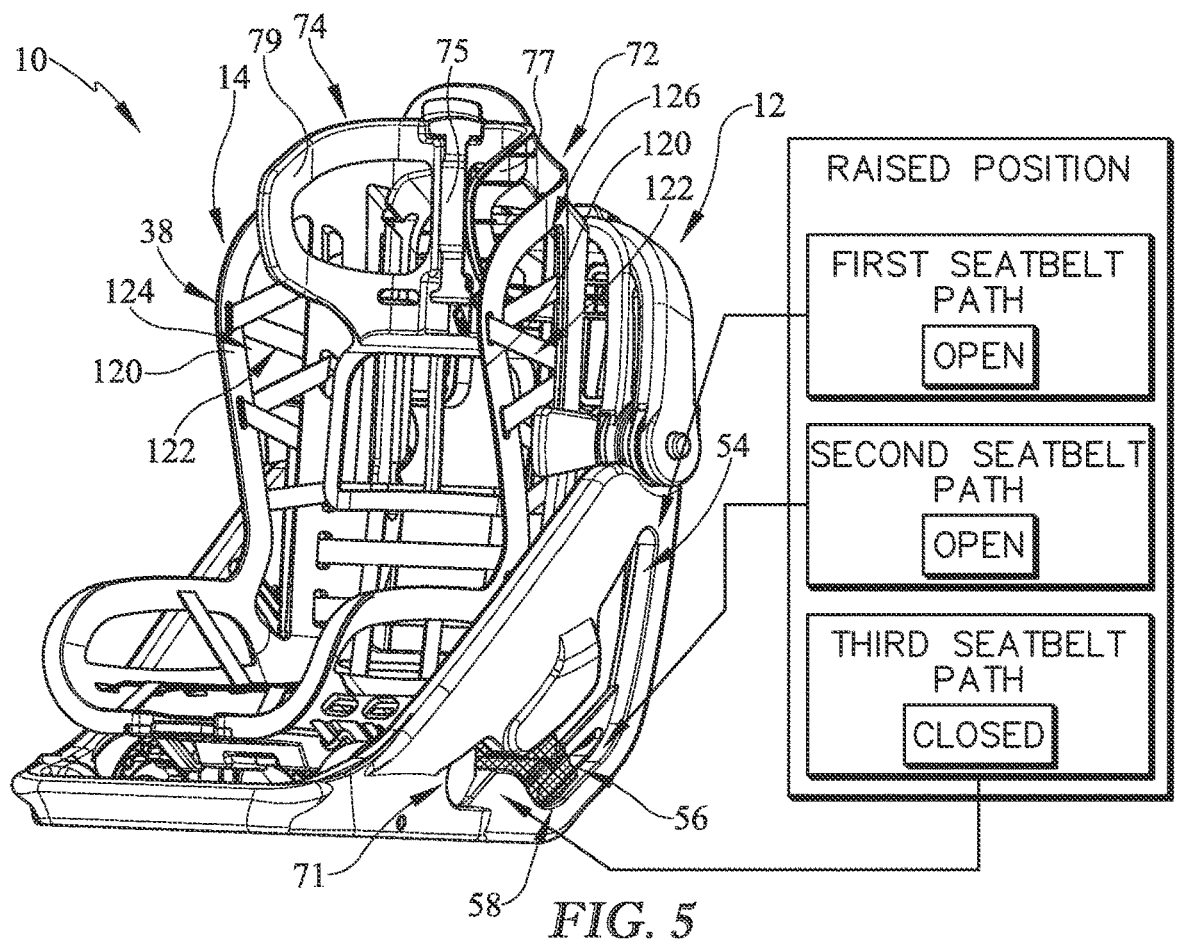
Figure 6:
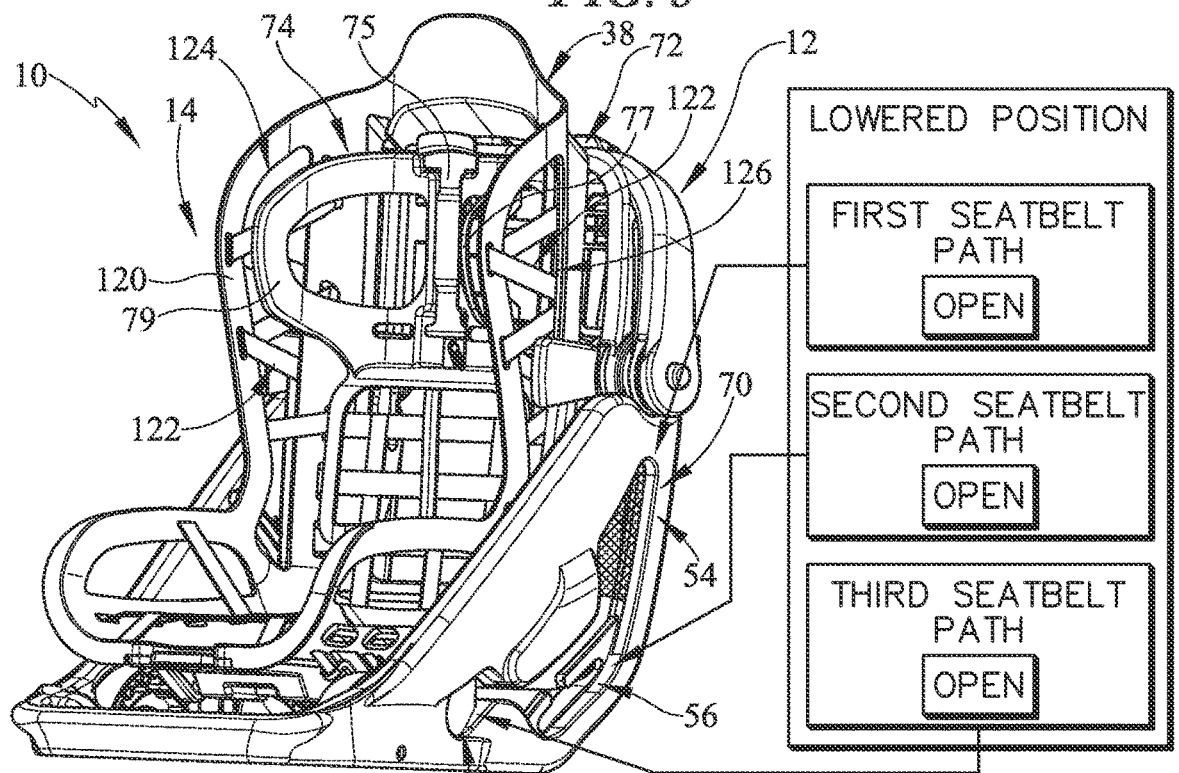
Figure 7:
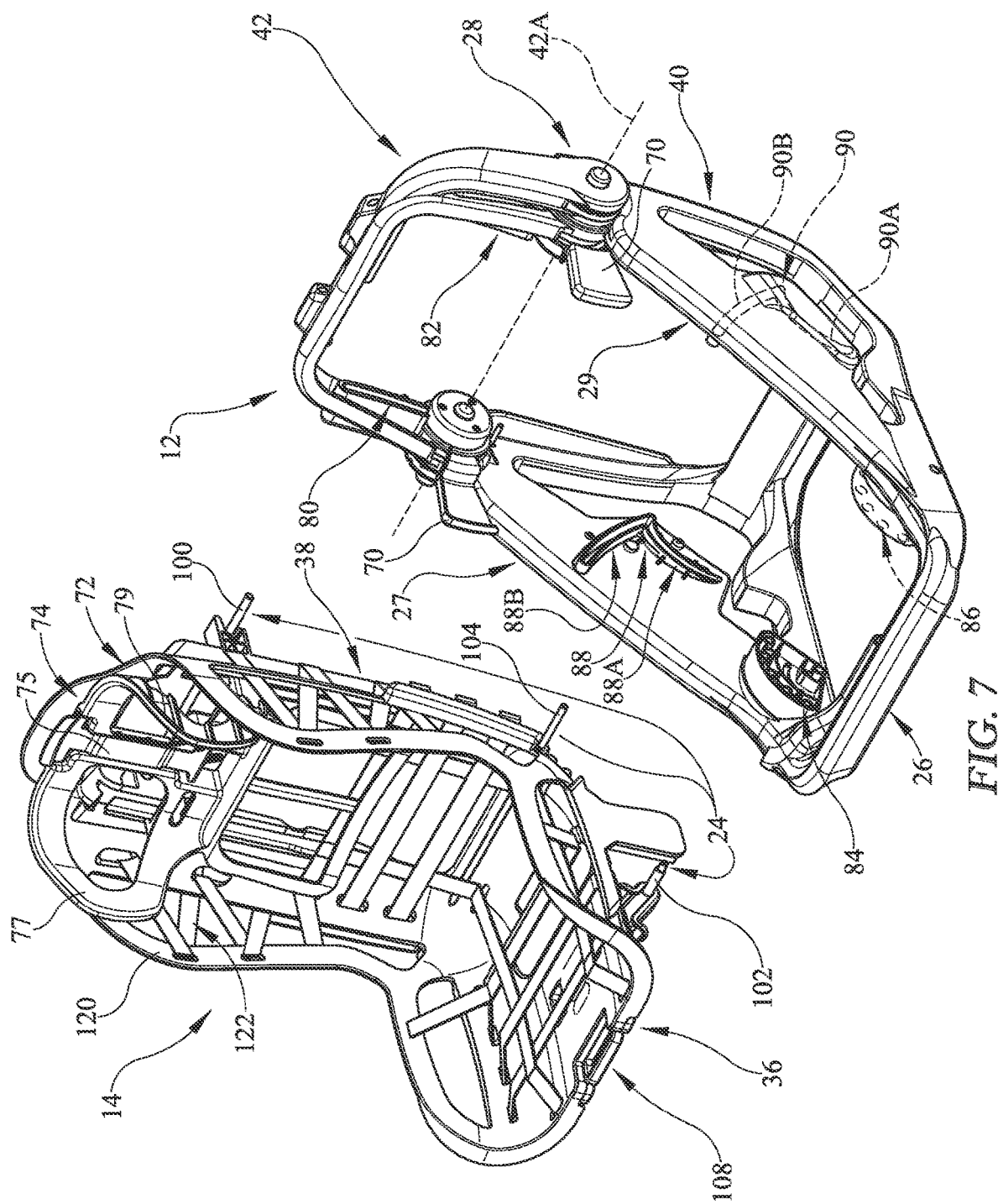

FIG. 5 is a perspective and diagrammatic view of the child restraint showing that the juvenile seat includes a seat bottom and a seat back having a backrest and a movable headrest coupled to the backrest for movement between a raised position, as shown in FIG. 5, and a lowered position, as shown in FIG. 6, and showing that the third seatbelt path is blocked when the headrest is in the raised position;

FIG. 6 is a perspective and diagrammatic view of the child restraint showing the headrest in the lowered position and the third seatbelt path blocked when the headrest is in the lowered position; and FIG. 7 is an exploded assembly view showing the juvenile seat separated from the outer seat-support shell to expose a plurality of seat anchors that attach the juvenile seat to the outer seat-support shell and a plurality of guide slots and apertures formed in the outer seat-support shell which receive the plurality of seat anchors.

DETAILED DESCRIPTION

Figure 1:
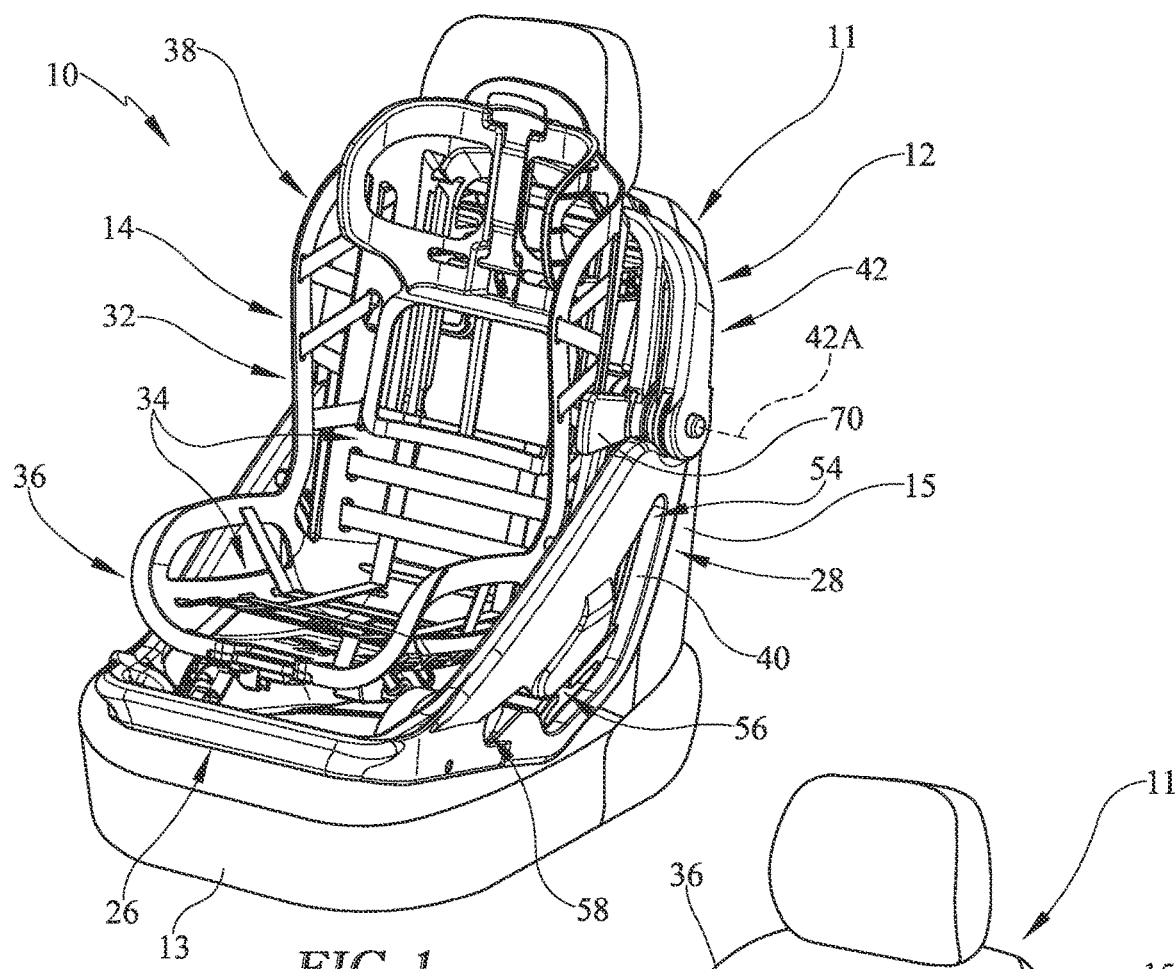

A child restraint 10 is adapted to be secured to a vehicle seat 11 is shown in FIG. 1. The child restraint 10 includes an outer, seat-support shell 12 and an inner juvenile seat 14 supported by the seat-support shell 12. The outer seat-support shell 12 is adapted to rest on the vehicle seat 11 and to be secured to the vehicle seat 11 for transportation in a vehicle. The outer seat-support shell 12 is formed to include a seat receiving space 16 which receives at least a portion of the inner juvenile seat 14. The inner juvenile seat 14 is at least partially received in the seat receiving space 16 and is formed to include a child-receiving space 18 sized to receive a child therein. The inner juvenile seat 14 is coupled to the outer seat-support shell 12 so as to be supported in spaced apart relation to the vehicle seat 11 and is configured to move selectively relative to the outer seat-support shell 12 to change a recline orientation of the inner juvenile seat 14 relative to the outer seat-support shell 12.

Figure 2:
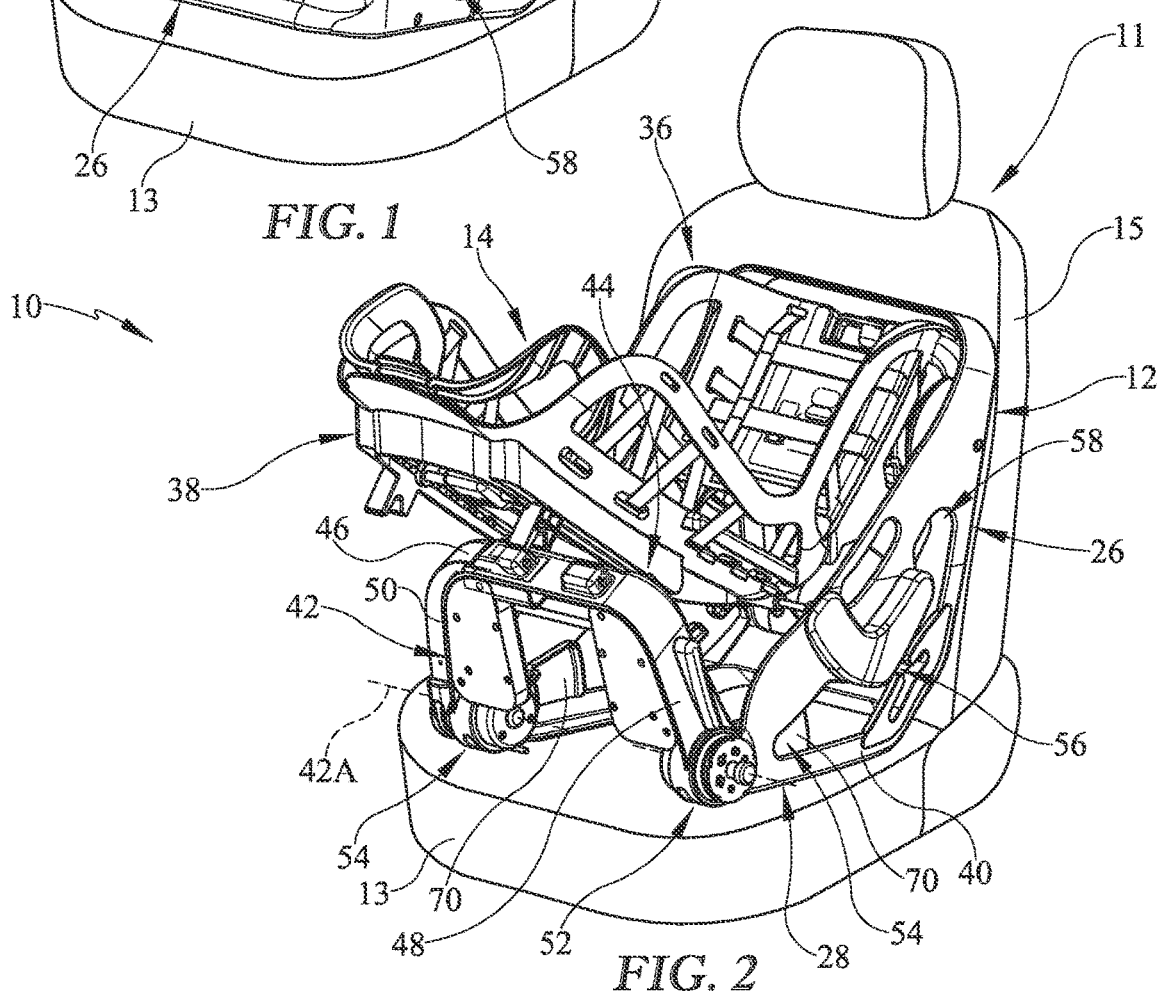
Figure 3:
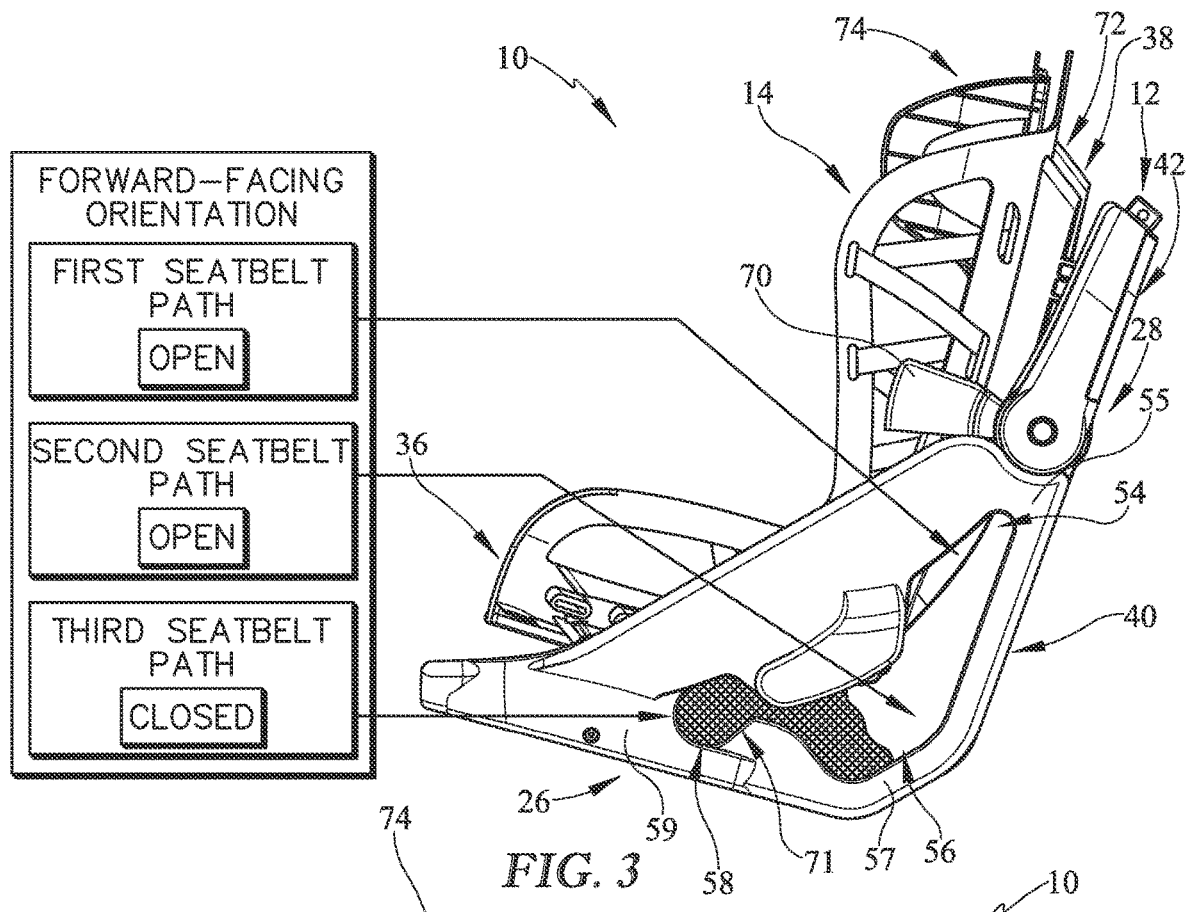
FIG. 3 is a side elevation and diagrammatic view of the child restraint arranged in the forward-facing arrangement showing that the child restraint further includes a belt-path barrier that is configured to block access to and/or obstruct the third seatbelt path when the child restraint is in the forward-facing arrangement and the juvenile seat brace is in the first seat-support position.

The seat-support shell 12 includes a shell bottom 26, a shell back 28 arranged to extend upwardly away from the shell bottom 26, and a pair of opposing side rails 27, 29 extending between the shell bottom 26 and the shell back 28 as shown in FIGS. 1-3. The shell bottom 26, the shell back 28, and the side rails 27, 29 are each formed from a rigid material such as a metal or a rigid plastic to provide structural support for the rest of the child restraint 10. The shell bottom 26, the shell back 28, and the side rails 27, 29 cooperate to provide spaces 54, 56, 58 which are sized to receive a vehicle seat belt to secure the child restraint 10 to the vehicle seat 11. Some of the spaces 54, 56, 58 may be obstructed depending on the configuration of the child restraint 10 to ensure that a user properly installs the child restraint 10 on the vehicle seat 11. Once installed on the vehicle seat 11, the vehicle seat belt is located beneath and/or behind the inner juvenile seat 14 so that the juvenile seat 14 is free to recline relative to the seat-support shell 12 without interference with the vehicle seat belt.

The inner juvenile seat 14 includes a seat chassis 32 coupled to the plurality of harness anchors 22 and an occupant-support pad 34 coupled to the seat chassis 32 and configured to support the child as shown in FIGS. 1-3. The seat chassis 32 and the occupant-support pad 34 cooperate to provide a seat bottom 36 and a seat back 38 for the inner juvenile seat 14. The seat chassis 32 is formed from rigid materials such as a metal or a rigid plastic to provide structural support for the inner juvenile seat 14. The occupant-support pad 34 is formed from materials that are flexible and/or compressible to increase comfort for the child.

The child restraint 10 may be arranged in either a forward-facing arrangement or a rearward-facing arrangement on the vehicle seat 11 as shown in FIGS. 1 and 2. In the forward-facing arrangement, the shell bottom 26 is arranged to lie on a seat cushion 13 of the vehicle seat 11 and the shell back 28 is arranged to lie on a backrest 15 of the vehicle seat 11. In the rearward-facing arrangement, the child restraint 10 is reoriented relative to the vehicle seat 11 so that the shell back 28 is now arranged to lie on the seat cushion 13 and the shell bottom 26 is arranges to lie on the backrest 15 of the vehicle seat 11.

The inner juvenile seat 14 is configured to move relative to the outer seat-support shell from a first recline orientation when the juvenile seat 14 is arranged in the forward-facing arrangement and a second recline orientation when the juvenile seat 14 is arranged in the rearward-facing arrangement as shown in FIGS. 1 and 2. In the first recline orientation, the seat back 38 of the juvenile seat 14 extends generally parallel to the shell back 28. In the second recline orientation, the seat back 38 extends away from the shell back 28.

The shell back 28 is configured to support the seat back 38 of the inner juvenile seat 14 in both the forward-facing arrangement and the rearward-facing arrangement. The shell back 28 includes a fixed back frame 40 coupled to the shell bottom 26 and a juvenile-seat brace 42 coupled to an upper end of the fixed back frame 40 as shown in FIGS. 1 and 2. The fixed back frame 40 is formed integrally with the shell bottom 26 and remains in a stationary position no matter what recline orientation the inner juvenile seat 14 is arranged in. The juvenile-seat brace 42 is coupled to the fixed back frame 40 for pivotable movement about a horizontal pivot axis 42A between a first seat-support position in the forward-facing arrangement and a second seat-support position in the rearward-facing arrangement. In the first seat-support position, an upper end of the juvenile-seat brace 42 is spaced apart from the juvenile seat 14. In the second seat-support position, the upper end of the juvenile-seat brace 42 engages the seat back 38 of the juvenile seat 14 to block movement of the juvenile seat 14 from the second recline orientation to the first recline orientation.

The outer seat-support shell 12 is formed to include a first seatbelt path 54, a second seatbelt path 56, and a third seatbelt path 58 as shown in FIGS. 1 and 2. The first seatbelt path 54 is located at a first junction 55 between the shell back 28 and the pair of side rails 27, 29. The second seatbelt path 56 is located at a second junction 57 between the shell bottom 26 and the shell back 28. The third seatbelt path 58 is located at a third junction 59 between the shell bottom 26 and the pair of side rails 27, 29. At least one of the seatbelt paths 54, 56, 58 in configured to be obstructed at any given time to block a user from installing the child restraint 10 on the vehicle seat using an incorrect combination of seatbelt paths 54, 56, 58.

In some embodiments, the juvenile seat 14 is configured to block access to the first seatbelt path 54 when the child restraint 10 is in the rearward-facing arrangement. In this situation, the vehicle seat belt is routed across the second and third seatbelt paths 56, 58 to properly install the child restraint 10 to the vehicle seat 11 in the rearward-facing arrangement. The first seatbelt path 54 is obstructed by the juvenile seat 14 to block a user from using the first seatbelt path 54 which could improperly secure the child restraint 10 to the vehicle seat 11 in the rearward-facing arrangement.

In some embodiments, the juvenile seat 14 is configured to block access to the third seatbelt path 58 when the child restraint 10 is in the forward-facing arrangement. In this situation, the vehicle seat belt is routed across the first and second seatbelt paths 54, 56 to properly install the child restraint 10 to the vehicle seat 11 in the forward-facing arrangement. The third seatbelt path 58 is obstructed by the juvenile seat 14 to block a user from using the third seatbelt path 58 which could improperly secure the child restraint 10 to the vehicle seat 11 in the forward-facing arrangement.

In some embodiments, the shell back 28 further includes a belt-path barrier 70 that is separate from the juvenile seat 14. The belt-path barrier 70 is illustratively embodied as a movable shield that is coupled to and movable with the juvenile-seat brace 42 to block access to block access to the first seatbelt path 54 when the juvenile-seat brace 42 is in the second seat-support position as suggested in FIGS. 2 and 4. In some embodiments, a separate shield 71 may also be coupled to the brace 42 or the juvenile seat 14 to block access to the third seatbelt path 58 when the juvenile-seat brace 42 is in the first seat-support position as suggested in FIGS. 1 and 3.

Figure 4:
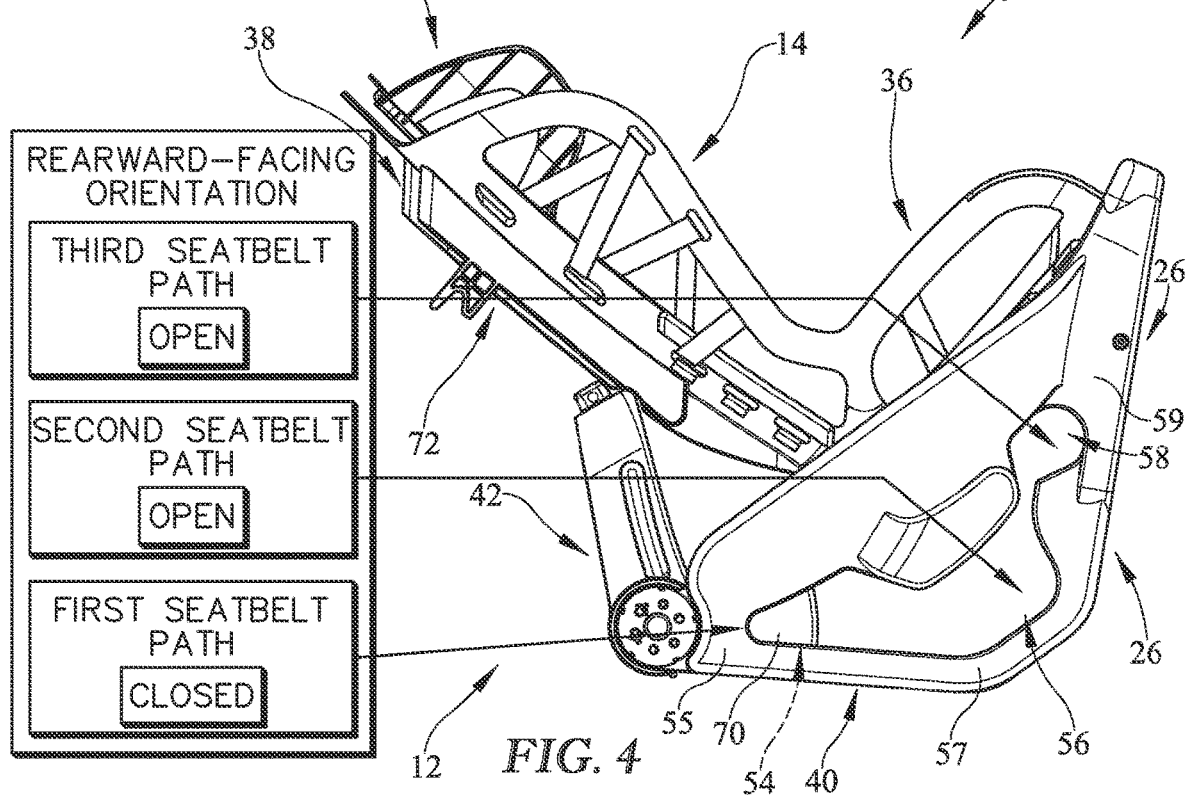
FIG. 4 is a side elevation and diagrammatic view of the child restraint arranged in the rearward-facing arrangement showing that the belt-path barrier is configured to block access to and/or obstruct the first seatbelt path when the child restraint is in the rearward-facing arrangement and the juvenile seat brace is in the second seat-support position.

The child restraint 10 illustratively includes two belt path barriers 70 coupled to opposite ends of the juvenile seat brace 42 to block access to at least one of the belt paths 54, 56 from both lateral directions of the child restraint 10. Each belt-path barrier 70 projects forward from the juvenile seat brace 42 and lies alongside the juvenile seat 14. Each belt-path barrier 70 is configured to pivot about the horizontal pivot axis 42A with the juvenile seat brace 42. Each belt-path barrier 70 is located laterally between the juvenile seat 12 and the outer seat-support shell 12 when the juvenile-seat brace 42 is in the second seat support position as shown in FIG. 4.

In some embodiments, the seat back 38 of the juvenile seat includes a backrest 72 coupled to the seat bottom 36 and a movable headrest 74 coupled to the backrest 72 as shown in FIGS. 5 and 6. The movable headrest 74 is configured to slide relative to the backrest 72 between a lowered position and a raised position. In the lowered position, the movable headrest 74 is spaced a first distance from the seat bottom 36.

In the raised position, the movable headrest 74 is spaced a second distance from the seat bottom 36 greater than the first distance.

In some embodiments, the belt-path barrier 70 is coupled to the seat back 36 of juvenile seat and moves with the movable headrest 74 to block access to at least one of the seatbelt paths 54, 56, 58. The belt-path barrier 70 is configured to block access to the third seatbelt path 58 when the movable headrest 74 is in the raised position and the belt-path barrier 70 is configured to block access to the first seatbelt path 54 when the movable headrest 70 is in the lowered position. In some embodiments, the headrest 74 is cooperates with the juvenile seat 14 and the juvenile-seat brace 42 to block access to the first seatbelt path 54 when the headrest 74 is in the lowered position, the juvenile seat 14 is in the second recline position, and the juvenile seat brace 42 is in the second seat-support position.

In some embodiments, the juvenile seat 14 includes a rigid frame 120 and flexible panels 122 extending across openings formed in the frigid frame 120 to both increase comfort for occupants and minimize material use and weight of the child restraint 10 as shown in FIGS. 5 and 6. For example, the rigid frame 120 is illustratively formed to include a pair of opposing lateral openings 124, 126 formed in the backrest 72. The pair of openings 124, 126 are located near a head region of smaller occupants, such as small infants, and a shoulder region of larger occupants as the children grow up. When children are smaller (i.e. less than 40 lbs) the movable headrest 74 is typically in a lower position relative to the backrest 72. The headrest 74 includes a headrest base 75 and a pair of opposing side wings 77, 79 which overlie the opposing openings 124, 126 in the backrest 72. Children are typically kept in the rearward-facing arrangement while they are this small and the juvenile seat brace 42 is in the second seat-support position. Thus, in the rearward-facing arrangement, the belt-path barrier 70 blocks the first seatbelt path 54 and the belt-path barrier 70 is spaced apart from the openings 124, 126 and the side wings 77, 79 of the headrest 74.

As the child grows, the headrest 74 may be raised to fit the height of the child as shown in FIG. 5. The child restraint 10 is also configured to be reoriented into the forward-facing arrangement which the juvenile seat brace 42 in the first seat-support position. With the headrest 74 raised, the side wings 77, 79 are positioned above at least a portion of the opposing openings 124, 126 in the backrest 72 and the belt-path barriers 70. The belt-path barriers 70 are aligned with the openings 124, 126 in the first seat-support positon. Thus, the belt-path barriers 70 may provide a shoulder support for the occupant in the forward-facing arrangement. The flexible panels 122 may include a mesh, webbing, or cloth-like material that engages the occupant. The belt-path barriers 70 are more rigid than the flexible panels 122 and may only support portions of the occupant during a side impact after the flexible panel 122 has stretched under load by the occupant, for example.

The seat back 38 of the juvenile seat 14 is formed to include a brace seat 44 which receives the juvenile-seat brace 42 in the second seat-support position as shown in FIGS. 2 and 3. In the illustrative embodiment, the brace seat 44 is a notch formed into a rear side of the seat back 38. In other embodiments, the brace seat 44 may be a protrusion that extends outward away from the rear side of the seat back 38.

The juvenile-seat brace 42 includes a top frame beam 46, a pair of side frame beams 48, 50 coupled to opposing lateral ends of the top frame beam 46, and a hinge lock 52 coupled to a lower end of at least one of the side frame beams 48, 50 and to an upper end of the fixed back frame 40 as shown in FIGS. 2 and 3. The top frame beam 46 is configured to engage the seat back 38 of the juvenile seat 14 when the juvenile-seat brace 42 is in the second seat-support position. The side frame beams 48, 50 extend way from the top frame beam 46 toward the fixed back frame 40. The hinge lock 52 is configured to block selectively movement of the juvenile-seat brace 42 about the horizontal pivot axis 42A between the first and second seat-support positions. Each of the seat-belt barriers 70 are coupled to a lower end of a respective side frame beam 48, 50

In illustrative embodiments, the child restraint 10 further includes a plurality of seat anchors 24 configured to secure the inner juvenile seat 14 to the seat-support shell 12. The plurality of seat anchors 24 extend between and interconnect the inner juvenile seat 14 and the seat-support shell 12. Each of the seat anchors 24 are embodied as a rod and allow selective movement of the inner juvenile seat 14 relative to the outer seat-support shell 12.

The seat-support shell 12 is formed to include a plurality of guide slots 80, 82, 88, 90 and a plurality of recline openings 84, 86 which receive the plurality of seat anchors 24 and allow the inner juvenile seat 14 to recline relative to the seat-support shell 12 as shown in FIG. 7. A first seat anchor 100 is arranged to lie is a first pair of guide slots 80, 82 formed in opposing lateral sides of the shell back 28. A second seat anchor 102 is arranged to lie in opposing recline apertures 84, 86 formed in at least one of the shell bottom 26 and the side rails 27, 29. A third seat anchor 104 is arranged to lie in a second pair of guide slots 88, 90 formed in opposing lateral sides of the side rails 27, 29 between the first pair of guide slots 80, 82 and the plurality of recline openings 84, 86.

The second seat anchor 102 is movable relative to the inner juvenile seat 14 by a recline actuator handle 108 mounted on a front end of the juvenile seat 14 as shown in FIG. 7. The second seat anchor 102 is configured to extend into one of the plurality of recline openings 84, 86 to block movement of the inner juvenile seat 14 relative to the seat-support shell 12. The recline actuator handle 108 may be pulled forward by a user to withdraw the second seat anchor 102 from the recline openings 84, 86. The first and third seat anchors 100, 104 are slidable through their respective guide slots 80, 82, 88, 90 when the second seat anchor 102 is withdrawn from the recline openings 84, 86 to change the recline orientation of the inner juvenile seat 14 relative to the seat-support shell 12.

The second pair of guide slots 88, 90 includes a forward-facing recline segment 88A, 90A and a rearward-facing recline segment 88B, 90B as shown in FIG. 7. The third seat anchor 104 is located in the forward-facing recline segments 88A, 90A when the child restraint 10 is in the forward-facing arrangement. The third seat anchor 104 is located in the rearward-facing recline segments 88B, 90B when the child restraint 10 is in the rearward-facing arrangement.

The first seat anchor 100 is releasable from the inner juvenile seat 14 so that the seat back 38 can separate from the shell back 28 when transitioning from the forward-facing arrangement to the rearward-facing arrangement. The seat back 38 then reengages the shell back 28 via the juvenile-seat brace 42 without engaging the first seat anchor 100. Thus, the juvenile seat 14 is engaged with the first seat anchor 100 in the forward-facing arrangement and is disengaged from the first seat anchor 100 in the rearward-facing arrangement.

The invention claimed is:

1. A child restraint comprising
an outer seat-support shell adapted to rest on a vehicle seat and to be secured to the vehicle seat for transportation in a vehicle, the outer seat-support shell being formed to include a seat receiving space and including a shell bottom, a shell back arranged to extend upwardly away from the shell bottom, and a pair of side rails arranged along opposite lateral sides of the outer seat-support shell and extending between and interconnecting the shell bottom and the shell back, wherein the outer seat-support shell is formed to include a first seatbelt path at a first junction between the shell back and the pair of side rails, a second seatbelt path at a second junction between the shell bottom and the shell back, and a third seatbelt path at a third junction between the shell bottom and the pair of side rails,
an inner juvenile seat at least partially received in the seat receiving space and configured to provide a child-receiving space sized to receive a child therein, the inner juvenile seat configured to move relative to the outer seat-support shell to change a recline orientation of the inner juvenile seat relative to the outer seat-support shell from a first recline orientation when the juvenile seat is arranged in a forward-facing arrangement and a second recline orientation when the juvenile seat is arranged in a rearward-facing arrangement, and
a belt-path barrier spaced apart from the first seatbelt path when the inner juvenile seat is in the forward-facing arrangement and configured to block access to the first seatbelt path when the inner juvenile seat is in the rearward-facing arrangement.

2. The child restraint of claim 1, wherein the juvenile seat is configured to block access to the third seatbelt path when the child restraint is in the forward-facing arrangement.

3. The child restraint of claim 1, wherein the shell back includes a fixed back frame coupled to the shell bottom and a juvenile-seat brace coupled to an upper end of the fixed back frame for pivotable movement about horizontal pivot axis between first seat-support position in which an upper end of the juvenile seat brace is spaced apart from the juvenile seat when the juvenile seat is arranged in the forward-facing arrangement and a second seat-support position in which an upper end of the juvenile-seat brace engages the juvenile seat when the juvenile seat is arranged in the rearward-facing arrangement, and wherein the belt-path barrier is movable with the juvenile-seat brace.

4. The child restraint of claim 3, wherein the juvenile-seat brace includes a top frame beam and a pair of side frame beams coupled to opposing lateral ends of the top frame beam, and wherein the belt-path barrier includes a movable shield coupled to a lower end of each side frame beam and arranged to extend forward away from the juvenile-seat brace.

5. The child restraint of claim 4, wherein each movable shield is arranged to lie between the inner juvenile seat and the outer seat-support shell in the second seat-support position.

6. The child restraint of claim 4, wherein the inner juvenile seat includes a rigid frame defining a pair of openings and a flexible panel covering the openings, and wherein each movable shield is mis-aligned with the pair of openings when the juvenile seat brace is in the first seat-support position and each movable shield is aligned with the pair of openings when the juvenile seat brace is in the second seat-support position.

7. The child restraint of claim 6, wherein the seat back of the inner juvenile seat includes a backrest and a headrest coupled to the backrest and slideable along the backrest between a lowered position and a raised position, and wherein the headrest includes a pair of side wings aligned with the pair of openings formed in the rigid frame when the headrest is in the lowered position and the juvenile seat brace is in the second seat support position and mis-aligned with the pair of openings formed in the rigid frame when the headrest is in the raised position and the juvenile seat brace is in the first seat support position.

8. The child restraint of claim 1, wherein the juvenile seat includes a seat bottom and a seat back arranged to extend upwardly away from the seat bottom, the seat back including a backrest coupled to the seat bottom and a movable headrest coupled to the backrest for movement between a lowered position spaced a first distance from the seat bottom and a raised position spaced a second distance from the seat bottom greater than the first distance, and wherein the belt-path barrier is configured to block access to the first seatbelt path when the movable headrest is in the lowered position.

9. The child restraint of claim 8, wherein the belt-path barrier moves with the headrest.

10. A child restraint comprising
an outer seat-support shell adapted to rest on a vehicle seat and to be secured to the vehicle seat for transportation in a vehicle, the outer seat-support shell is formed to include a first seatbelt path,
an inner juvenile seat coupled to the outer seat-support shell and configured to provide a child-receiving space sized to receive a child therein, the inner juvenile seat configured to move relative to the outer seat-support shell to change a recline orientation of the inner juvenile seat relative to the outer seat-support shell from a first recline orientation when the juvenile seat is arranged in a forward-facing arrangement and a second recline orientation when the juvenile seat is arranged in a rearward-facing arrangement, and
a belt-path barrier spaced apart from the first seatbelt path when the inner juvenile seat is in the forward-facing arrangement and configured to block access to the first seatbelt path when the inner juvenile seat is in the rearward-facing arrangement.

11. The child restraint of claim 10, wherein the outer seat-support shell is formed to include a second seatbelt path and a third seatbelt path, and the juvenile seat is configured to block access to the third seatbelt path when the child restraint is in the forward-facing arrangement.

12. The child restraint of claim 10, wherein outer seat-support shell includes fixed back frame and a juvenile-seat brace coupled to an upper end of the fixed back frame for pivotable movement about horizontal pivot axis between first seat-support position in which an upper end of the juvenile seat brace is spaced apart from the juvenile seat when the juvenile seat is arranged in the forward-facing arrangement and a second seat-support position in which an upper end of the juvenile-seat brace engages the juvenile seat when the juvenile seat is arranged in the rearward-facing arrangement, and wherein the belt-path barrier is movable with the juvenile-seat brace.

13. The child restraint of claim 12, wherein the juvenile-seat brace includes a top frame beam and a pair of side frame beams coupled to opposing lateral ends of the top frame beam, and wherein the belt-path barrier includes a movable shield coupled to a lower end of each side frame beam and arranged to extend forward away from the juvenile-seat brace.

14. The child restraint of claim 13, wherein each movable shield is arranged to lie laterally between the inner juvenile seat and the outer seat-support shell in the second seat-support position.

15. The child restraint of claim 13, wherein the inner juvenile seat includes a rigid frame defining a pair of openings and a flexible panel covering the openings, and wherein each movable shield is mis-aligned with the pair of openings when the juvenile seat brace is in the first seat-support position and each movable shield is aligned with the pair of openings when the juvenile seat brace is in the second seat-support position.

16. The child restraint of claim 15, wherein the inner juvenile seat includes a backrest and a headrest coupled to the backrest and slideable along the backrest between a lowered position and a raised position, and wherein the headrest includes a pair of side wings aligned with the pair of openings formed in the rigid frame when the headrest is in the lowered position and the juvenile seat brace is in the second seat support position and mis-aligned with the pair of openings formed in the rigid frame when the headrest is in the raised position and the juvenile seat brace is in the first seat support position.

17. The child restraint of claim 10, wherein the juvenile seat includes a seat bottom and a seat back arranged to extend upwardly away from the seat bottom, the seat back including a backrest coupled to the seat bottom and a movable headrest coupled to the backrest for movement between a lowered position spaced a first distance from the seat bottom and a raised position spaced a second distance from the seat bottom greater than the first distance, and wherein the belt-path barrier is configured to block access to the first seatbelt path when the movable headrest is in the lowered position.

* * * * *